(12) United States Patent
Hu et al.

(10) Patent No.: US 11,353,412 B1
(45) Date of Patent: Jun. 7, 2022

(54) INSPECTION SYSTEM FOR CONTACT NETWORK DAMAGE DETECTION

(71) Applicant: EAST CHINA JIAOTONG UNIVERSITY, Nanchang (CN)

(72) Inventors: Jun Hu, Nanchang (CN); Yu Huang, Nanchang (CN); Yunbo Gao, Nanchang (CN); Chengcheng Guo, Nanchang (CN); Qi Zhong, Nanchang (CN); Yaxin Lai, Nanchang (CN)

(73) Assignee: EAST CHINA JIAOTONG UNIVERSITY, Nanchang (CN)

( * ) Notice: Subject to any disclaimer, the term of this patent is extended or adjusted under 35 U.S.C. 154(b) by 0 days.

(21) Appl. No.: 17/561,757

(22) Filed: Dec. 24, 2021

(30) Foreign Application Priority Data

Jan. 13, 2021 (CN) .......................... 202110040566.7

(51) Int. Cl.
| | | |
|---|---|---|
| *B61L 25/02* | (2006.01) | |
| *G01N 23/18* | (2018.01) | |
| *G01S 17/89* | (2020.01) | |
| *G01N 23/083* | (2018.01) | |
| *G01N 23/04* | (2018.01) | |

(52) U.S. Cl.
CPC ............. *G01N 23/18* (2013.01); *G01N 23/04* (2013.01); *G01N 23/083* (2013.01); *G01S 17/89* (2013.01); *G01N 2223/646* (2013.01)

(58) Field of Classification Search
CPC ... A61B 5/107; A61B 2090/3762; A61B 5/24; A61B 6/12; A61B 6/08; A61B 6/40; B60L 9/00; B60L 50/53; B60L 5/24; B60L 3/0023; B60L 3/00; G01N 23/046; G01N 23/083; G01N 2223/419; G01N 2223/646; G01N 2223/41; G01N 2223/645; G01N 2201/101
See application file for complete search history.

(56) References Cited

FOREIGN PATENT DOCUMENTS

WO    WO-2018087337 A1 *    5/2018    .......... B61L 27/0027

\* cited by examiner

*Primary Examiner* — Don K Wong

(57) ABSTRACT

The present disclosure provides an inspection system for contact network damage detection, including: a laser imaging radar, an X-ray transmitter, a booster, an X-ray receiver, and a control circuit board. The laser imaging radar emits a laser beam to a contact line for scanning. A laser radiation reflected by the contact line is received, and a continuous analog signal is generated, which is restored to a real-time image of the contact line. After the analog signal is converted into a digital signal on the control circuit board, a height of the contact line in a horizontal direction is calculated to determine a wear degree on an outer surface of the contact line. The booster boosts electric energy obtained by the pantograph on the contact line and supply power to the X-ray transmitter.

6 Claims, 2 Drawing Sheets

INSPECTION SYSTEM FOR CONTACT NETWORK DAMAGE DETECTION

CROSS REFERENCE TO RELATED APPLICATIONS

The present disclosure claims foreign priority of Chinese Patent Application No. 202110040566.7, filed on Jan. 13, 2021 in China National Intellectual Property Administration, the entire contents of which are hereby incorporated by reference in their entireties.

TECHNICAL FIELD

The present disclosure relates to the field of contact network damage detection technologies, and in particular to an inspection system for contact network damage detection.

BACKGROUND

A contact wire is a high-voltage pre-tensioned wire erected along an upper part of an electrified railway, and its material is usually pure copper, copper-silver alloy, copper-magnesium alloy and copper-tin alloy. During the operation of a train, a pantograph sliding plate installed on the top of locomotive slides through contact with a contact line and transmits the obtained electric energy to a power supply system of the electric locomotive as the driving force for high-speed operation. This process is also known as pantographing. The quality of the pantograph and its stability directly determine whether the electric locomotive can operate safely and reliably. The pantograph and contact line form a pantograph network system, which constitutes an important power supply system for the electrified railroad.

The contact network has been in service for a long time under natural conditions, and the working environment is very harsh due to wind, rain, and sun. The relative sliding between the pantograph networks greatly increases the frictional damage of the contact line, shortening the service life of the contact line. These complex factors directly affect the normal work of the contact line, resulting in insufficient energy supply to the train or even direct disconnection. Coupled with the fact that there is no backup for the contact line, a failure will cause huge losses to the normal operation of the railroad system and pose a threat to the safety of people's lives and property.

In the prior art, wear detection of contact lines is mainly carried out by a grinding surface width method and a residual diameter method. The grinding surface width method includes a laser scanning method and an image processing method. The laser scanning refers to repeated scanning of the contact wire after using a laser to irradiate the prism. When the contact grinding surface is encountered, the laser is reflected to a receiving end and the width of the contact wire grinding surface is measured according to the returned information. The image processing method is to collect a contact network image by a camera and then use digital image processing technology for image processing to calculate the contact grinding width. The residual diameter method is mainly divided into two types: ultrasonic type and optical quantity type. The basic principle of the two is to obtain the wear amount by measuring the height difference remaining after the contact line wear. These methods can detect the outer surface wear degree of the contact line, but cannot detect the internal damage of the contact line for damage detection.

SUMMARY OF THE DISCLOSURE

To solve the above technical problems, the present disclosure aims to provide an inspection system for contact network damage detection by arranging a laser imaging radar on a head of a pantograph to detect the wear degree of the outer surface of the contact line, arranging an X-ray transmitter and an X-ray receiver at corresponding ends of the head of the pantograph to detect the internal damage of the contact line using the X-ray damage detection principle, and positioning the contact line where the damage occurs through the Beidou positioning module. Then 5G communication technology is applied to transmit the detected information to the monitoring center of the railroad department and the train running on the line in real time. This enables real-time monitoring of the internal and external damage of the contact line, and facilitates the staff to find the position of the contact line that needs maintenance based on the positioning information.

The present disclosure provides an inspection system for contact network damage detection, comprising: a laser imaging radar, an X-ray transmitter, a booster, an X-ray receiver, and a control circuit board; wherein the laser imaging radar, the X-ray transmitter, the booster, and the control circuit board are arranged on an end of a head of a pantograph, and the X-ray receiver is arranged on the other end of the head of the pantograph; the laser imaging radar is configured to emit a laser beam to a contact line for scanning; a laser radiation reflected by the contact line is received, and a continuous analog signal is generated, which is restored to a real-time image of the contact line; after the analog signal is converted into a digital signal on the control circuit board, a height of the contact line in a horizontal direction is calculated to determine a wear degree on an outer surface of the contact line; the booster is configured to boost electric energy obtained by the pantograph on the contact line and supply power to the X-ray transmitter; the X-ray transmitter and the X-ray receiver form an X-ray damage detector, which probes an inside damage of the contact line.

Further, the X-ray emitter is configured to emit an X-ray to the contact line; since a defect medium inside the contact line has a different radiation absorption capacity from surrounding intact parts, an intensity of a ray passing through a defect part is different from an intensity of ray passing through the surrounding intact parts; the X-ray passing through the contact line enters the X-ray receiver; on the X-ray receiver, the defect part and a non-defect part of the contact line are exposed to different radiation; an image output from the X-ray receiver is received by the control circuit board to perform image identification and calculation to obtain the inside damage of the contact line.

Further, the control circuit board is arranged with a DSP controller, a Beidou positioning module, and a 5G module; the DSP controller is configured to receive information collected by the laser imaging radar and the X-ray receiver, calculate a wear defect on a surface of the contact line after receiving the information collected by the laser imaging radar, and calculate a damage defect inside the contact line through a digital image processing technology after receiving the image information from the X-ray receiver; the Beidou positioning module is configured to detect positions of the laser imaging radar and the X-ray receiver in real time, and send detected geographic position information to the DSP controller; the 5G module is controlled by the DSP controller to send damage situation and position information of the defect contact line to a relevant railway monitoring department and a train running on line, to facilitate the staff to perform purposeful inspection and repair on the contact line.

Further, the X-ray receiver comprises an image intensifier and a CMOS detector; the X-ray projected through the contact line produces a weak visible light image at a receiving end of the image intensifier; a visible photon image is converted to a corresponding electronic image by a photocathode, and resulting electrons are accelerated and focused to an image output of the image intensifier under an action of a high-voltage electric field; under a dual action of electrons and accelerated convergence, a fluorescent screen at the image output of the image intensifier is excited to produce a visible light image of sufficient brightness, which is received by the CMOS detector and transmitted to the DSP controller for image processing.

Further, the DSP controller performs image identification of the image detected by CMOS detector in the following scheme: image obtaining is performed on the X-ray through the contact line by the CMOS detector, and the obtained image is grayed out; a two-dimensional median filtering method is applied to filter the obtained image and eliminate a noise; a histogram equalization algorithm is applied to improve a contrast of the image; a threshold segmentation method is applied to separate defect regions and a background region in the image; a contour tracking method based on chain code table is applied to track and extract the defect regions; feature parameters of each defect region are calculated, and specific position and geometry of each defect region are marked; after completing the multi-defect tracking, boundaries of the defect regions are closed, and a seed filling algorithm is applied to assign a gray value different from the background region to the defect regions; a range calibration is completed; common defect feature parameters are calculated from marked pixels; 4-link chain code is converted to 8-link chain code, a perimeter of the defect regions is calculated, the number of all pixels inside each defect region is counted, and a sum of the numbers of pixels inside the defect regions is obtained to find an area of the defect regions; according to the perimeter and area of the defect regions, a degree of the inside damage of the contact line is determined.

Since the present disclosure uses the laser imaging radar to detect defects on the outer surface of the contact line and X-ray damage detection technology to detect the structure of the internal damage of the contact line, the following beneficial effects can be obtained:

A laser imaging radar is arranged on a head of a pantograph to detect the wear degree of the outer surface of the contact line, an X-ray transmitter and an X-ray receiver are arranged at corresponding ends of the head of the pantograph to detect the internal damage of the contact line using the X-ray damage detection principle, and the contact line where the damage occurs is positioned through the Beidou positioning module. Then 5G communication technology is applied to transmit the detected information to the monitoring center of the railroad department and the train running on the line in real time. This enables real-time monitoring of the internal and external damage of the contact line, and facilitates the staff to find the position of the contact line that needs maintenance based on the positioning information.

DESCRIPTION OF MAIN COMPONENT SYMBOLS

Figure 1:
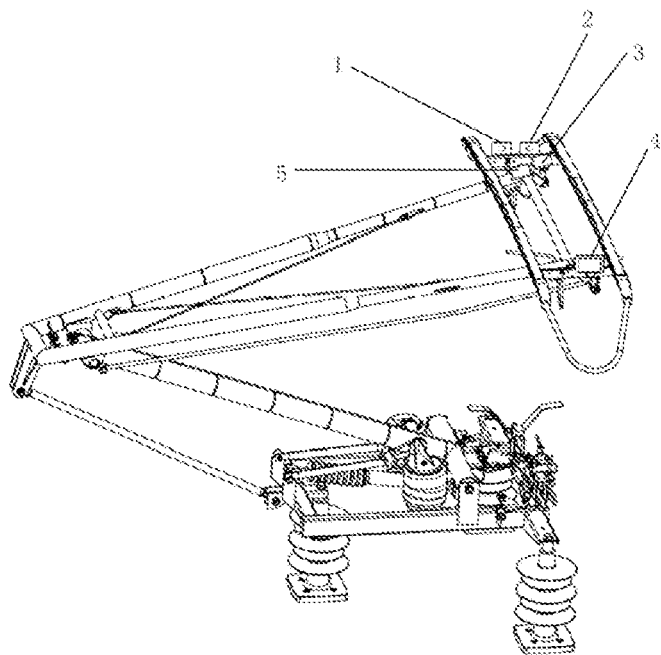
FIG. 1 is a structural schematic view of an inspection system for contact network damage detection according to an embodiment of the present disclosure.

| | |
|---|---|
| Laser imaging radar | 1 |
| X-ray transmitter | 2 |
| Booster | 3 |
| X-ray receiver | 4 |
| Control circuit board | 5 |
| DSP controller | 6 |
| Beidou positioning module | 7 |
| 5G module | 8 |
| Image intensifier | 9 |
| CMOS detector | 10 |

DETAILED DESCRIPTION

The present disclosure will be further described in detail below in conjunction with the embodiments and the accompanying drawings.

Referring to FIGS. 1 to 4, an inspection system for contact network damage detection in the present disclosure includes a laser imaging radar 1, an X-ray transmitter 2, a booster 3, an X-ray receiver 4, and a control circuit board 5.

As shown in FIG. 1, the laser imaging radar 1, the X-ray transmitter 2, the booster 3, and the control circuit board 5 are arranged on an end of a pantograph head, and the X-ray receiver 4 is arranged on the other end of the pantograph head. The laser imaging radar 1 emits a laser beam to a contact line for scanning. The laser radiation reflected by the contact line is received, and a continuous analog signal is generated, which is restored to a real-time image of the contact line. After the analog signal is converted into a digital signal on the control circuit board 5, the height of the contact line in a horizontal direction is calculated to determine the degree of wear on an outer surface of the contact line. The booster 3 boosts the electric energy obtained by the pantograph on the contact line and supplies power to the X-ray transmitter 2. The X-ray transmitter 2 and the X-ray receiver 4 form an X-ray damage detector, which probes an inside damage of the contact line and realizes real-time monitoring of the internal and external damages of the contact line.

The laser imaging radar 1, the X-ray transmitter 2, the booster 3, the X-ray receiver 4, the control circuit board 5 and the pantograph head are isolated by an insulating material. The laser imaging radar 1, the control circuit board 5, and the X-ray receiver 4 may be powered by a power step-down module to reduce the voltage obtained by the pantograph to a voltage level acceptable to the laser imaging radar 1, the control circuit board 5, and the X-ray receiver 4.

Figure 2:
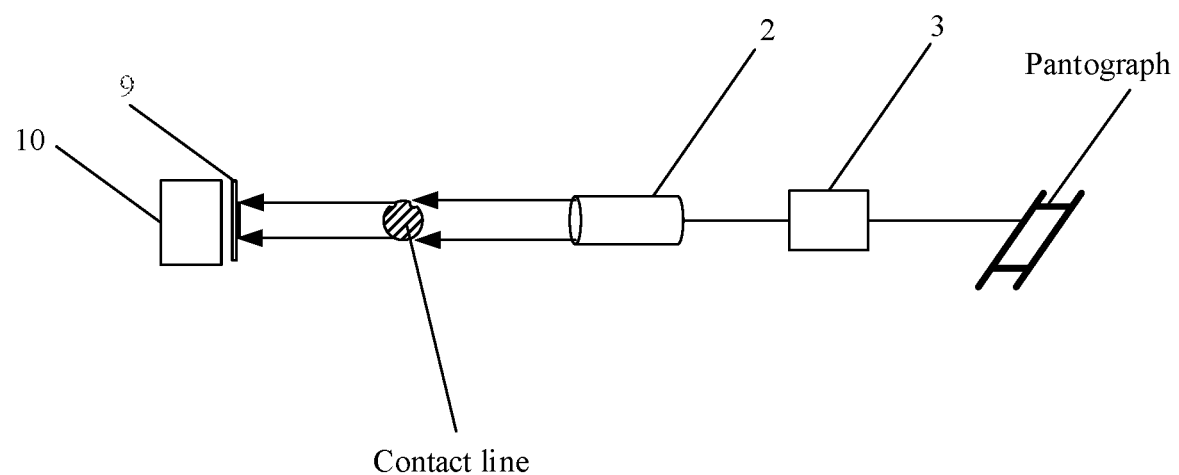
FIG. 2 is a schematic view of an X-ray inspection on an internal damage of a contact line of an inspection system for contact network damage detection according to an embodiment of the present disclosure.

As shown in FIG. 2, the X-ray emitter 2 emits an X-ray to the contact line. Since a defect medium inside the contact line has a different radiation absorption capacity from surrounding intact parts, the intensity of the ray passing through the defect part is different from that of the surrounding intact parts. The X-ray passing through the contact line enters the X-ray receiver 4. On the X-ray receiver 4, the defect part and the non-defect part of the contact line are exposed to different radiation. An image output from the X-ray receiver 4 is received by the control circuit board 5 to perform image identification, which in turn allows the calculation of the damage inside the contact line.

Figure 4:
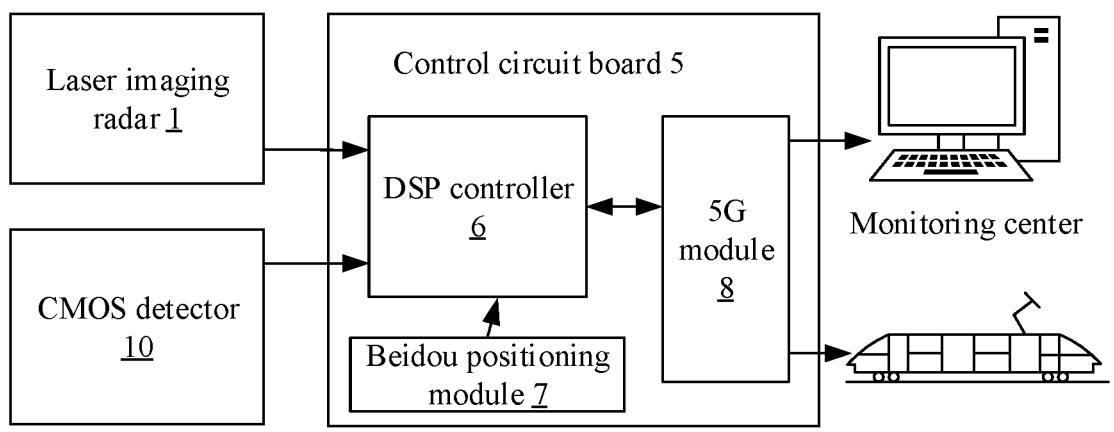
FIG. 4 is a working principal view of an inspection system for contact network damage detection according to an embodiment of the present disclosure.

As shown in FIG. 4, the control circuit board 5 is arranged with a DSP controller 6, a Beidou positioning module 7, and a 5G module 8. The DSP controller 6 is configured to receive information collected by the laser imaging radar 1 and the X-ray receiver 4; calculate a wear defect on the surface of the contact line after receiving the information collected by the laser imaging radar 1; and calculate a damage defect inside the contact line through a digital image processing technology after receiving the image information from the X-ray receiver 4. The Beidou positioning module 7 is configured to detect positions of the laser imaging radar 1 and the X-ray receiver 4 in real time; and send detected geographic position information to the DSP controller 6. The 5G module 8 is controlled by the DSP controller 6 to send damage situation and position information of the defect contact line to the relevant railway monitoring department and the train running on the line, to facilitate the staff to perform purposeful inspection and repair on the contact line.

As shown in FIG. 2, the X-ray receiver 4 includes an image intensifier 9 and a CMOS detector 10. The X-ray projected through the contact line produces a weak visible light image at a receiving end of the image intensifier 9. The visible photon image is converted to a corresponding electronic image by a photocathode, and resulting electrons are accelerated and focused to an image output of the image intensifier under the action of a high-voltage electric field. Under the dual action of electrons and accelerated convergence, a fluorescent screen at the image output of the image intensifier 9 is excited to produce a visible light image of sufficient brightness, which is received by the CMOS detector 10. The received image is transmitted to the DSP controller 6 for image processing, thereby identifying the internal defects of the contact line.

Figure 3:
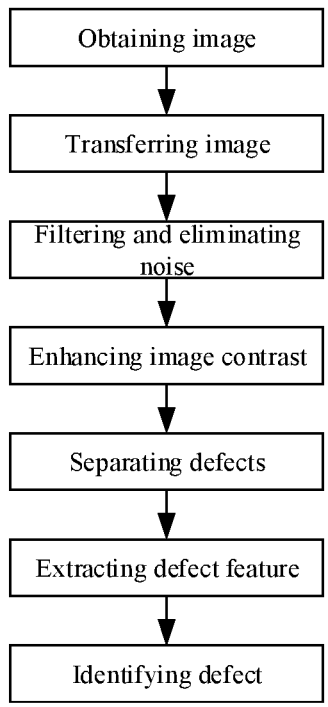
FIG. 3 is a schematic view of an image identification on an internal damage image of a contact line performed by an inspection system for contact network damage detection according to an embodiment of the present disclosure.

As shown in FIG. 3, the DSP controller 6 performs image identification of the image detected by CMOS detector 10 in the following scheme: image obtaining on X-rays through the contact line is performed by the CMOS detector 10, and the obtained image is grayed out to improve the efficiency of image processing; the image will be disturbed by the external environment in the process of obtaining, causing the image to carry noise, and a two-dimensional median filtering method is performed to filter the obtained image and eliminate the noise. Because the detected image has a narrow interval occupied by the gray value, and such image contrast is not high, it is therefore necessary to expand the gray range of the image to improve the contrast of the image for improving the image quality. Therefore, a histogram equalization algorithm is applied to improve the contrast of the image, a threshold segmentation method is applied to separate the defect region and the background region in the image, and a contour tracking method based on chain code table is applied to track and extract the defect. Feature parameters of each defect region are calculated, and specific position and geometry of each defect are marked. After completing the multi-defect tracking, the boundaries of the defects are closed, and a seed filling algorithm is applied to assign the gray value different from the background region to the defect region. Then the calibration of a range is completed. Common defect feature parameters may be calculated from the marked pixels, the idea is to assume that at least one pixel point inside the defect region is known and called a seed, and all other points are searched in the region and filled. When an adjacent point is not in the defect region, the adjacent point is a boundary point. When the adjacent point is in the defect region, then the point is taken as a new known point and the searching is continued to perform until all the internal points are searched. 4-link chain code is converted to 8-link chain code and the perimeter of the defect is calculated. The number of all pixels inside the defect is counted, and the sum is thus obtained to find the area of the defect region. According to the perimeter and area of the defect, the degree of damage inside the contact line is determined.

The working principle and working process of the present disclosure are as follows:

As shown in FIG. 4, the DSP controller 6 receives the information collected by the laser imaging radar 1 and the X-ray receiver 4. After receiving the information collected by the laser imaging radar 1, the DSP controller 6 calculates the wear defect on the surface of the contact line. The DSP controller 6 calculates the damage defect inside the contact line through the digital image processing technology after receiving the image information from the X-ray receiver 4. The Beidou positioning module 7 is configured to detect the positions of the laser imaging radar 1 and the X-ray receiver 4 in real time; and send the detected geographic position information to the DSP controller 6. The 5G module 8 is controlled by the DSP controller 6 to send damage situation and position information of the defect contact line to the relevant railway monitoring department and the train running on the line, to facilitate the staff to perform purposeful inspection and repair on the contact line.

The above is only preferable embodiments of the present disclosure, and is not intended to limit the present disclosure. Any modification, equivalent replacement and improvement within the spirit and principles of the present disclosure, should be included in the scope of the present disclosure.

What is claimed is:

1. An inspection system for contact network damage detection, comprising: a laser imaging radar, an X-ray transmitter, a booster, an X-ray receiver, and a control circuit board;
   wherein the laser imaging radar, the X-ray transmitter, the booster, and the control circuit board are arranged on an end of a head of a pantograph, and the X-ray receiver is arranged on the other end of the head of the pantograph;
   the laser imaging radar is configured to emit a laser beam to a contact line for scanning; a laser radiation reflected by the contact line is received, and a continuous analog signal is generated, which is restored to a real-time image of the contact line; after the analog signal is converted into a digital signal on the control circuit board, a height of the contact line in a horizontal direction is calculated to determine a wear degree on an outer surface of the contact line; the booster is configured to boost electric energy obtained by the pantograph on the contact line and supply power to the X-ray transmitter; the X-ray transmitter and the X-ray receiver form an X-ray damage detector, which probes an inside damage of the contact line.

2. The inspection system according to claim 1, wherein the X-ray emitter is configured to emit an X-ray to the contact line; since a defect medium inside the contact line has a different radiation absorption capacity from surrounding intact parts, an intensity of a ray passing through a defect part is different from an intensity of ray passing through the surrounding intact parts; the X-ray passing through the contact line enters the X-ray receiver; on the X-ray receiver, the defect part and a non-defect part of the contact line are exposed to different radiation; an image output from the X-ray receiver is received by the control circuit board to perform image identification and calculation to obtain the inside damage of the contact line.

3. The inspection system according to claim 1, wherein the control circuit board is arranged with a DSP controller, a Beidou positioning module, and a 5G module;

the DSP controller is configured to receive information collected by the laser imaging radar and the X-ray receiver, calculate a wear defect on a surface of the contact line after receiving the information collected by the laser imaging radar, and calculate a damage defect inside the contact line through a digital image processing technology after receiving the image information from the X-ray receiver;

the Beidou positioning module is configured to detect positions of the laser imaging radar and the X-ray receiver in real time, and send detected geographic position information to the DSP controller; the 5G module is controlled by the DSP controller to send damage situation and position information of the defect contact line to a relevant railway monitoring department and a train running on line.

4. The inspection system according to claim 3, wherein the X-ray receiver comprises an image intensifier and a CMOS detector;

the X-ray projected through the contact line produces a weak visible light image at a receiving end of the image intensifier; a visible photon image is converted to a corresponding electronic image by a photocathode, and resulting electrons are accelerated and focused to an image output of the image intensifier under an action of a high-voltage electric field; under a dual action of electrons and accelerated convergence, a fluorescent screen at the image output of the image intensifier is excited to produce a visible light image of sufficient brightness, which is received by the CMOS detector and transmitted to the DSP controller for image processing, thereby identifying an internal defect of the contact line.

5. The inspection system according to claim 4, wherein the DSP controller performs image identification of the image detected by CMOS detector in the following scheme:

image obtaining is performed on the X-ray through the contact line by the CMOS detector, and the obtained image is grayed out;

a two-dimensional median filtering method is applied to filter the obtained image and eliminate a noise; a histogram equalization algorithm is applied to improve a contrast of the image; a threshold segmentation method is applied to separate defect regions and a background region in the image; a contour tracking method based on chain code table is applied to track and extract the defect regions;

feature parameters of each defect region are calculated, and specific position and geometry of each defect region are marked; after completing the multi-defect tracking, boundaries of the defect regions are closed, and a seed filling algorithm is applied to assign a gray value different from the background region to the defect regions; a range calibration is completed; common defect feature parameters are calculated from marked pixels;

4-link chain code is converted to 8-link chain code, a perimeter of the defect regions is calculated, the number of all pixels inside each defect region is counted, and a sum of the numbers of pixels inside the defect regions is obtained to find an area of the defect regions; according to the perimeter and area of the defect regions, a degree of the inside damage of the contact line is determined.

6. The inspection system according to claim 1, wherein the laser imaging radar, the X-ray transmitter, the booster, the X-ray receiver, the control circuit board, and the head of the pantograph are isolated by an insulating material; the laser imaging radar, the control circuit board, and the X-ray receiver are powered by a power step-down module to reduce a voltage obtained by the pantograph to a voltage level acceptable to the laser imaging radar, the control circuit board, and the X-ray receiver.

* * * * *